United States Patent
Ho

(10) Patent No.: US 7,866,837 B2
(45) Date of Patent: Jan. 11, 2011

(54) SKEW LIGHT ILLUMINATION LENS DEVICE

(76) Inventor: Yen-Wei Ho, P.O. Box 215, Taichung (TW) 40099

( * ) Notice: Subject to any disclaimer, the term of this patent is extended or adjusted under 35 U.S.C. 154(b) by 168 days.

(21) Appl. No.: 12/230,636

(22) Filed: Sep. 3, 2008

(65) Prior Publication Data
US 2010/0033944 A1 Feb. 11, 2010

(30) Foreign Application Priority Data
Aug. 8, 2008 (TW) .............................. 97130425 A

(51) Int. Cl.
*F21V 9/14* (2006.01)
*F21V 5/00* (2006.01)
(52) U.S. Cl. .......................... 362/19; 362/326; 362/336
(58) Field of Classification Search ................. 362/331, 362/335, 19, 326, 332, 336
See application file for complete search history.

(56) References Cited

U.S. PATENT DOCUMENTS
6,361,192 B1 * 3/2002 Fussell et al. ............... 362/331

* cited by examiner

*Primary Examiner*—John A Ward

(57) ABSTRACT

A skew light illumination lens body mainly directs the light from a illuminant device to diffuse to a predetermined direction. The lens body includes a base with a receiving slot having a downwards opening for receiving the illuminant device. A top side of the receiving slot is covered by a concaved arc as a light incident side. An convex curved surface is formed deviated from the center axis on the top of the base with a predetermined angle. The dense light of the illuminant device will be refracted and gathered by the concaved arc to the highest point of the convex curved surface and being projected.

5 Claims, 5 Drawing Sheets

SKEW LIGHT ILLUMINATION LENS DEVICE

FIELD OF THE PRESENT INVENTION

The present invention relates to optic lens, and particular to a lens for a illuminant system which is capable of gathering and refracting the light from a illuminant device and projecting to a specific direction with a predetermined angle from the original light axis.

DESCRIPTION OF THE PRIOR ART

A prior lens is usually made as a column shape with a spherical top for gathering the light and with a Light Emitting Diode (LED) capsulated inside. However, the light is gathered around the light axis of the source so the light energy is too concentrated and the illuminating area is too small. To enlarge the illuminating area, many inventions about distribution of plurality of LEDs with light guiding plate are provided to improve the illuminating area and uniformity. Furthermore, the LEDs are positioned on a substrate with particular angle or stepped to interlace the lights from different LEDs on a specific area. These kinds of structure are widely used in street light. For example, the Taiwan patent No. M333028 related to LED module with large area and high uniformity and No. 326105 related to illumination module with highly optic and heat dissipation effect are effective to increase the illuminating area.

However, above patents are all using the same LED of lens shape on center or edge area so that the LEDs on the edge side will be comparative lower luminous because there are no LEDs on the outer side to interlace the light.

SUMMARY OF THE PRESENT INVENTION

Accordingly, the primary object of the present invention is to provide a skew light illumination lens device for gathering and refracting the light of the illuminant device from the light axis of the lens with a predetermined angle.

To achieve above object, the present invention enclose a skew light illumination lens device having a base with a receiving slot having a downwards opening for receiving an illuminant device. A top side of the receiving slot is covered by a concaved arc for receiving the light emitting portion of the illuminant device. An convex curved surface is formed deviated from the light axis of the base with a predetermined angle. The convex curved surface has a highest point as a center, the thickness of the front and rear part of the convex curved surface are gradually reduced asymmetric. The ratio of width of the front to the rear part of the convex curved surface is 4 to 1. The thickness of the left and right part of the convex curved surface is gradually reduced symmetric. Therefore, the dense part of the light will be gathered from the concaved arc and refracted to the highest point of the convex curved surface and projected.

DETAILED DESCRIPTION OF THE INVENTION

Figure 1:
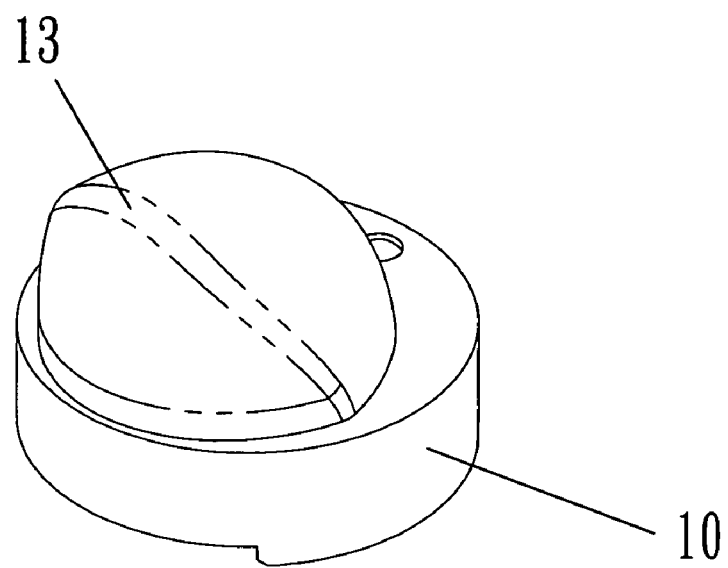
FIG. 1 is a perspective view of the skew light illumination lens device of the present invention.
Figure 2:
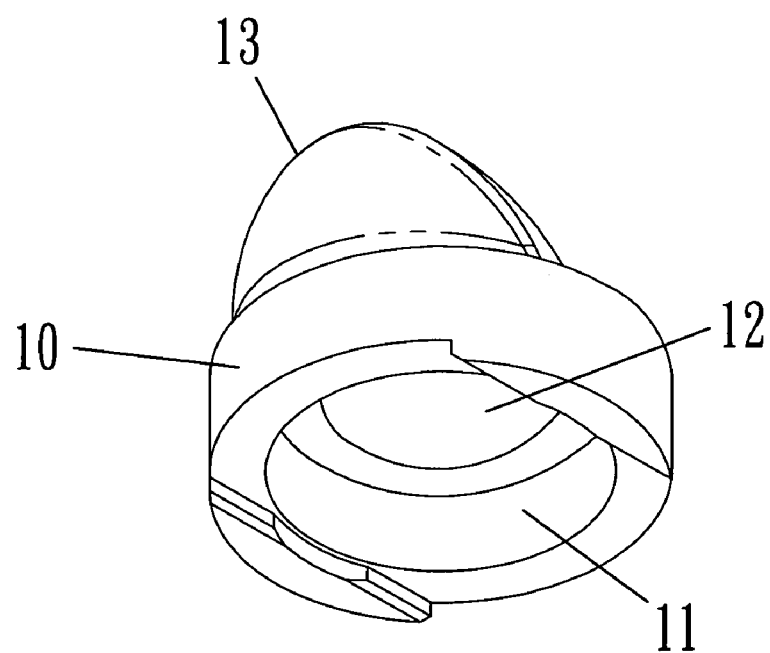
FIG. 2 is a perspective view of the skew light illumination lens device of the present invention viewing from another angle.
Figure 3:
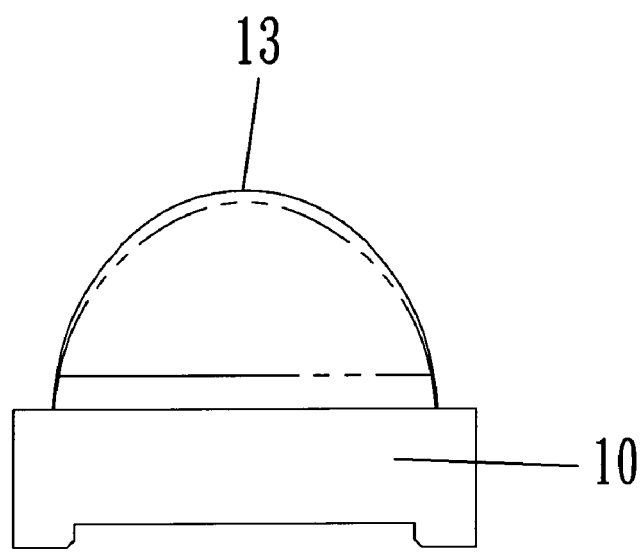
FIG. 3 is a schematic view of the skew light illumination lens device of the present invention viewing from a front side.
Figure 4:
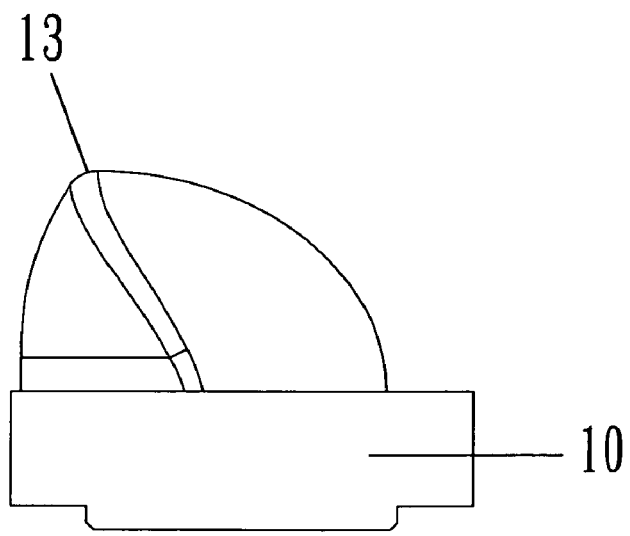
FIG. 4 is a schematic view of the skew light illumination lens device of the present invention viewing from a lateral side.
Figure 5:
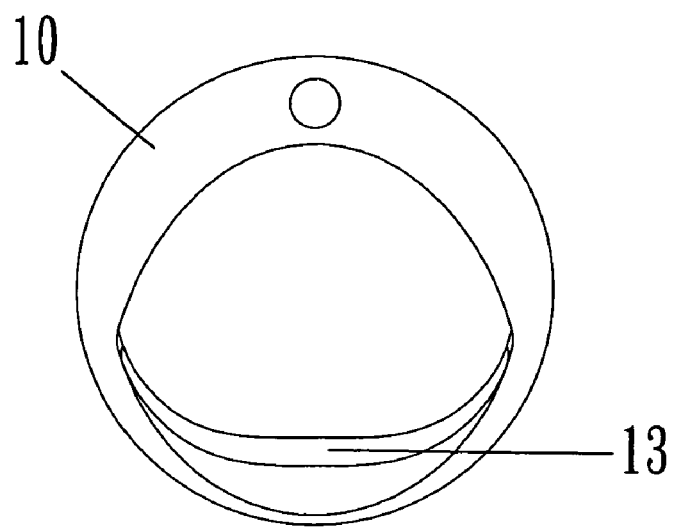
FIG. 5 is a schematic view of the skew light illumination lens device of the present invention viewing from a top side.
Figure 6:
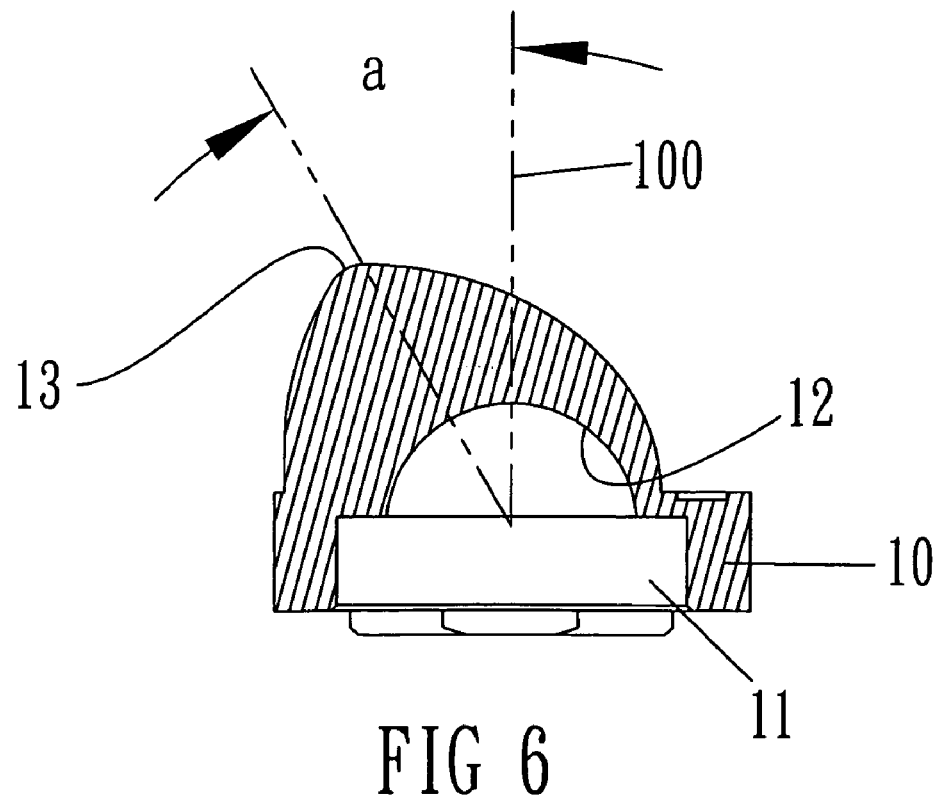
FIG. 6 is a cross section view from a lateral side of the skew light illumination lens device of the present invention.
Figure 7:
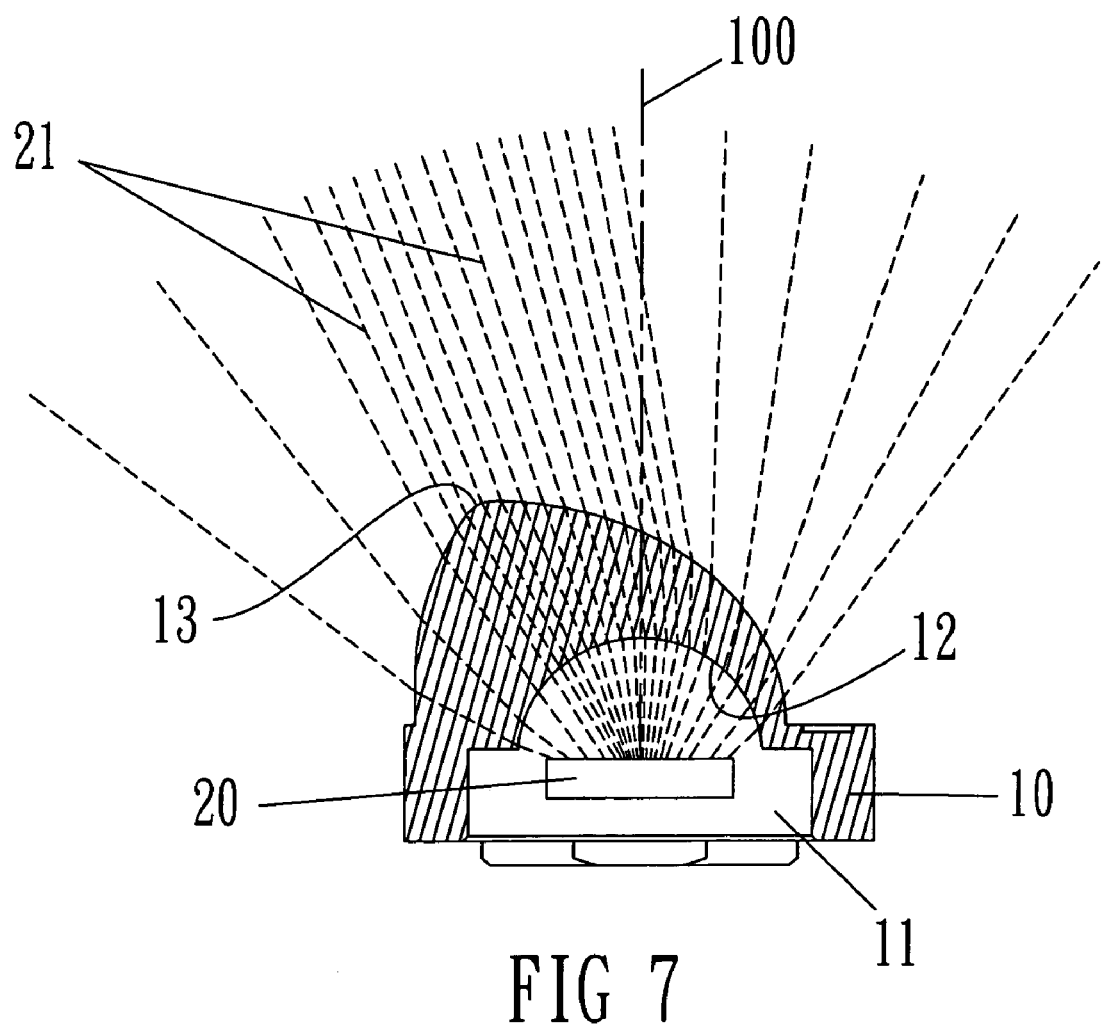
FIG. 7 is a cross section view and a schematic view showing the light refraction of the skew light illumination lens device of the present invention.

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Firstly, an preferable embodiment of a skew light illumination lens device according to the present invention is illustrated in FIGS. 1 to 7. The lens body includes a highly transparent base 10 with a receiving slot 11 which has a downwards opening serves to receive a illuminant device 20. A top side of the receiving slot 11 is covered by a concaved arc 12 for receiving the light emitting portion of the illuminant device as a light incident side. On the top of the base 10, a convex curved surface 13 is formed deviated from the light axis 100 with a predetermined angle as a light projecting side. The convex curved surface 13 has a highest point as a center, the thickness of the front and rear part of the convex curved surface 13 are gradually reduced asymmetric. The ratio of the width of the front to the rear part of the convex curved surface 13 is 4 to 1. The thickness of the left and right part of the convex curved surface 13 is gradually reduced symmetric.

Accordingly, the light 21 emitted from the illuminant device 20 will go through the cancaved arc 12 which is the incident side. The light 21 will be further refracted by the cancaved arc 12, the most part of the light will be gathered around the highest point of the convex curved surface 13 and a skew light illumination is so generated.

Furthermore, the angle between the line cross the highest point of the convex curved surface to the center of the concaved arc and the light axis 100 of the concaved arc 12 and the base 10 is around 20 degrees to 40 degrees.

Figure 8:
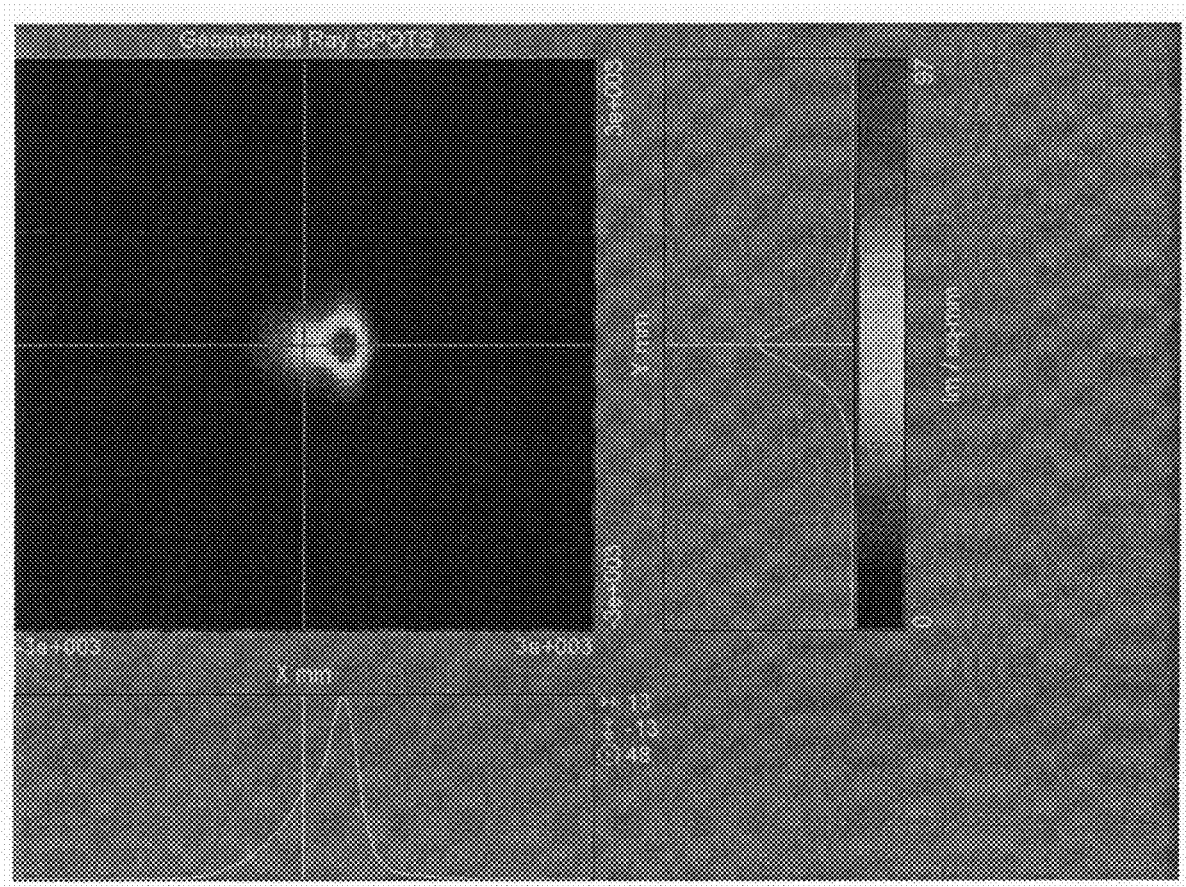
FIG. 8 is a simulated illumination distribution of the skew light illumination lens device of the present invention.

In FIG. 8, an illumination distribution showing a deviation diffusing of the light of the skew light illumination lens device according to the present invention is shown. By the design of the convex curved surface deviated from the light axis, the light will be gathered and projected with a predetermined angle from the light axis.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A skew light illumination lens device comprising a base with a receiving slot having a downwards opening for receiving a illuminant device; a top side of the receiving slot having a concaved arc; on a top side of the base, a convex curved surface being formed deviated from a light axis of the base;

the light emitted from the illuminant device being refrated by the concaved arc and being gathered to a highest point of the convex curved surface so that a skew light illumination being generated, wherein an thickness of the convex curved surface is decreased gradually outwards from the highest point thereof, and an thickness of the front and the rear part of the convex curved surface are asymmetric, while the thickness of the left and the right part thereof are symmetric.

2. A skew light illumination lens device comprising a base with a receiving slot having a downwards opening for receiving a illuminant device; a top side of the receiving slot having a concaved arc; on a top side of the base, a convex curved surface being formed deviated from a light axis of the base; the light emitted from the illuminant device being refrated by the concaved arc and being gathered to a highest point of the convex curved surface so that a skew light illumination being generated, wherein an angle between the line cross the highest point of the convex curved surface to a center of the concaved arc and the light axis of the concaved arc and the base is around 20 degrees to 40 degrees.

3. The skew light illumination lens device as claimed in claim 2, wherein the base is a symmetric column body.

4. The skew light illumination lens device as claimed in claim 2, wherein the illuminant device is a Light Emitting Diode.

5. A skew light illumination lens device comprising a base with a receiving slot having a downwards opening for receiving a illuminant device; a top side of the receiving slot having a concaved arc; on a top side of the base, a convex curved surface being formed deviated from a light axis of the base; the light emitted from the illuminant device being refrated by the concaved arc and being gathered to a highest point of the convex curved surface so that a skew light illumination being generated, wherein an thickness of the convex curved surface is decreased gradually outwards from the highest point thereof, and an thickness of the front and the rear part of the convex curved surface are asymmetric, while the thickness of the left and the right part thereof are symmetric, and an angle between the line cross the highest point of the convex curved surface to a center of the concaved arc and the light axis of the concaved arc and the base is around 20 degrees to 40 degrees.

* * * * *